United States Patent
Moriya et al.

(10) Patent No.: US 8,714,037 B2
(45) Date of Patent: May 6, 2014

(54) ENGINE STARTING DEVICE AND VEHICLE INCORPORATING THE SAME

(75) Inventors: Kouki Moriya, Aichi-gun (JP); Jumpei Kakehi, Toyota (JP); Hasrul Sany Bin Hashim, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/578,049

(22) PCT Filed: Jul. 16, 2010

(86) PCT No.: PCT/JP2010/062083
§ 371 (c)(1),
(2), (4) Date: Aug. 9, 2012

(87) PCT Pub. No.: WO2012/008045
PCT Pub. Date: Jan. 19, 2012

(65) Prior Publication Data
US 2012/0304818 A1    Dec. 6, 2012

(51) Int. Cl.
*F02N 15/00*  (2006.01)
*F02N 15/02*  (2006.01)
*F02N 15/04*  (2006.01)
*F02N 15/06*  (2006.01)
*F02N 11/08*  (2006.01)

(52) U.S. Cl.
USPC .............................. 74/7 R; 74/7 A; 123/179.3

(58) Field of Classification Search
USPC ....... 74/6, 7 R, 7 A; 123/179.1, 179.3, 179.4; 290/38 R, 40 A; 701/112, 113
See application file for complete search history.

(56) References Cited

U.S. PATENT DOCUMENTS 4,774,915 A * 10/1988 Nguyen et al. ............. 123/179.3
5,742,137 A *  4/1998 Bratton et al. ................ 318/139
(Continued)

FOREIGN PATENT DOCUMENTS

EP      2 159 410      3/2010
JP      2000 97139     4/2000
(Continued)

OTHER PUBLICATIONS

International Search Report issued Oct. 5, 2010 in PCT/JP10/62083 Filed Jul. 16, 2010.
U.S. Appl. No. 13/144,999, filed Jul. 18, 2011.

*Primary Examiner* — Troy Chambers
*Assistant Examiner* — Jane Cook
(74) *Attorney, Agent, or Firm* — Oblon, Spivak, McClelland, Maier & Neustadt, L.L.P.

(57) ABSTRACT

A device for starting an engine includes a starter for starting the engine and an ECU. The starter includes a pinion gear for engagement with a ring gear for cranking the engine, an actuator structured to engage the pinion gear with a ring gear, and a motor for rotating the pinion gear. The actuator and the motor can individually be controlled. The ECU has a rotation mode for driving the motor prior to drive of the actuator and an engagement mode for causing the actuator to engage the pinion gear and the ring gear with each other prior to drive of the motor. When a request to start the engine is made, the ECU switches selection between the rotation mode and the engagement mode based on a rotation speed of the engine and a reduction rate in rotation speed of the engine.

12 Claims, 6 Drawing Sheets

(56) References Cited

U.S. PATENT DOCUMENTS

| | | | |
|---|---|---|---|
| 7,275,509 B2 * | 10/2007 | Kassner | 123/179.25 |
| 2010/0050970 A1 | 3/2010 | Okumoto et al. | |
| 2010/0059007 A1 | 3/2010 | Senda et al. | |
| 2010/0251851 A1 * | 10/2010 | Usami et al. | 74/7 A |
| 2010/0282199 A1 | 11/2010 | Heyers et al. | |
| 2011/0118962 A1 * | 5/2011 | Couetoux et al. | 701/113 |

FOREIGN PATENT DOCUMENTS

| | | |
|---|---|---|
| JP | 2005 330813 | 12/2005 |
| JP | 2007 16618 | 1/2007 |
| JP | 2009 191843 | 8/2009 |
| JP | 2009 529114 | 8/2009 |
| JP | 2010 31851 | 2/2010 |
| JP | 2010 84754 | 4/2010 |

* cited by examiner

ENGINE STARTING DEVICE AND VEHICLE INCORPORATING THE SAME

TECHNICAL FIELD

The present invention relates to an engine starting device and a vehicle incorporating the same and more particularly to control of a starting device capable of individually controlling an actuator for engaging a pinion gear with a ring gear of the engine and a motor for rotating the pinion gear.

BACKGROUND ART

In recent years, in order to improve fuel efficiency or reduce exhaust emission, some cars having an internal combustion engine such as an engine include what is called an idling-stop function, in which an engine is automatically stopped while a vehicle stops and a driver operates a brake pedal, and the vehicle is automatically re-started, for example, by a driver's operation for re-start such as decrease in an amount of operation of a brake pedal to zero.

In this idling-stop, the engine may be re-started while an engine rotation speed is relatively high. In such a case, with a conventional starter in which engagement of a pinion gear for rotating the engine and rotation of the pinion gear are caused by one drive command, the starter is driven after waiting until the engine rotation speed sufficiently lowers, in order to facilitate engagement between the pinion gear and a ring gear of the engine. Accordingly, a time lag is caused between issuance of a re-start request of an engine and actual engine cranking, and the driver may feel uncomfortable.

In order to solve such a problem, Japanese Patent Laying-Open No. 2005-330813 (PTL 1) discloses a technique, with the use of a starter configured such that a pinion gear engagement operation and a pinion gear rotational operation can individually be controlled, for causing a pinion gear to perform a rotational operation prior to the pinion gear engagement operation when a re-start request is issued while rotation of an engine is being lowered immediately after a stop request is generated, and for re-starting the engine by performing the pinion gear engagement operation when a pinion gear rotation speed is in synchronization with an engine rotation speed.

CITATION LIST

Patent Literature

PTL 1: Japanese Patent Laying-Open No. 2005-330813
PTL 2: Japanese Patent Laying-Open No. 2009-529114
PTL 3: Japanese Patent Laying-Open No. 2010-31851
PTL 4: Japanese Patent Laying-Open No. 2000-97139
PTL 5: Japanese Patent Laying-Open No. 2009-191843

SUMMARY OF INVENTION

Technical Problem

According to the technique described in Japanese Patent Laying-Open No. 2005-330813 (PTL 1), even when a re-start request is issued while rotation of an engine is being lowered immediately after a stop request is generated, the engine can be cranked without the need for waiting for lowering in the engine rotation speed.

When a re-start request is generated during sharp lowering in engine rotation speed, for example, in such a case that an engine stops in a situation where engine load is great because of sudden braking or actuation of an air-conditioner, a time period until a rotation speed is synchronized may be shorter than an operation time period for engagement of a second gear. Then, even though an operation for rotating the second gear is performed prior to an operation for engaging the second gear, it is likely that a first gear cannot be engaged with the second gear with a rotation speed of the second gear being in synchronization with an engine rotation speed.

The present invention was made to solve such problems, and an object of the present invention is to re-start an engine in a short period of time without waiting for lowering in engine rotation speed while worsening of a state of engagement between a first gear and a second gear is suppressed, in an engine starting device having a starter capable of independently causing an operation for engaging the second gear and an operation for rotating the second gear.

Solution to Problem

A device for starting an engine according to the present invention includes a starter for starting the engine and a control device for controlling the starter. The starter includes a second gear that can be engaged with a first gear coupled to a crankshaft of the engine, an actuator for moving the second gear to an engagement position with the first gear in a driven state, and a motor for rotating the second gear. The control device is capable of individually controlling each of the actuator and the motor. The control device carries out control by using a first mode in which the motor is driven prior to drive of the actuator and a second mode in which the actuator engages the first gear and the second gear with each other prior to drive of the motor. Then, the control device switches selection between the first mode and the second mode based on a reduction rate in rotation speed of the engine, when a request for starting the engine based on an operator's operation is made.

According to such a device for starting an engine, the starter capable of individually controlling each of the actuator and the motor is controlled by using the first mode in which the motor is driven prior to drive of the actuator and the second mode in which the actuator engages the first gear and the second gear with each other prior to drive of the motor. Then, when a request for starting the engine is made, selection between the first mode and the second mode is switched based on a reduction rate in engine rotation speed. When the engine rotation speed sharply lowers (that is, when a reduction rate is great), there may be a case where the engine rotation speed has already lowered by the time of completion of the operation for engagement by the actuator, in spite of an attempt to start the engine with the use of the first mode. Therefore, selection between the first mode and the second mode can appropriately be made by taking into account a reduction rate in engine rotation speed.

Preferably, the control device switches selection between the first mode and the second mode based on a rotation speed of the engine and the reduction rate in rotation speed of the engine, when the request for starting the engine based on the operator's operation is made.

With such a configuration, selection between the first mode and the second mode can more appropriately be made by taking into account not only the reduction rate in engine rotation speed but also the engine rotation speed.

Preferably, the control device selects the first mode when magnitude of the reduction rate is smaller than a threshold value while the rotation speed of the engine is intermediate between a first reference value and a second reference value greater than the first reference value.

With such a configuration, in the case where an engine rotation speed is relatively high and the engine rotation speed gradually slows down, it is highly unlikely that the engine rotation speed has lowered by the time of completion of the operation for engagement by the actuator. Therefore, by selecting the first mode, a difference in rotation speed between the first gear and the second gear can be made smaller and hence the first gear and the second gear can smoothly be engaged with each other.

Preferably, the control device selects the second mode regardless of the reduction rate when the rotation speed of the engine is lower than the first reference value.

With such a configuration, in the case where the engine rotation speed is low, the first gear and the second gear can be engaged with each other while the second gear is stopped.

Preferably, the control device selects the second mode when magnitude of the reduction rate is greater than the threshold value while the rotation speed of the engine is intermediate between the first reference value and the second reference value.

With such a configuration, when the engine rotation speed sharply lowers in spite of the engine rotation speed having been relatively high, it is highly likely that the engine rotation speed has lowered by the time of completion of the operation for engagement by the actuator. Then, by adopting the first mode, to the contrary, there is a possibility that a difference in rotation speed between the first gear and the second gear becomes great. Therefore, by selecting the second mode in such a case, the first gear and the second gear can smoothly be engaged with each other.

Preferably, the control device selects the second mode when the rotation speed of the engine at the time when an operation for engagement by the actuator is expected to complete is lower than a rotation speed of the motor converted to a speed of the crankshaft of the engine at the time when the operation for engagement by the actuator is expected to complete.

With such a configuration, when the engine rotation speed at the time when the operation for engagement by the actuator is expected to complete is lower than the motor rotation speed converted to the crankshaft speed of the engine at the time when the operation for engagement by the actuator is expected to complete, that is, when a difference in rotation speed between the first gear and the second gear cannot be made smaller, the first gear and the second gear can smoothly be engaged with each other by selecting the second mode.

Preferably, the control device determines that synchronization is established when a difference between the rotation speed of the engine at the time when an operation for engagement by the actuator is expected to complete and a rotation speed of the motor converted to the crankshaft speed of the engine at the time when the operation for engagement by the actuator is expected to complete is in the range between predetermined threshold values, and in the case where the first mode is selected, the control device drives the actuator to engage the first gear and the second gear with each other when it is determined that synchronization is established.

With such a configuration, in the case of the first mode, when a difference between the engine rotation speed at the time when the operation for engagement by the actuator is expected to complete and the motor rotation speed is within a predetermined range, that is, when a difference in rotation speed between the first gear and the second gear becomes small, the first gear and the second gear can be engaged with each other.

Preferably, the control device starts drive of the actuator at a time point calculated by subtracting an operation time period of the actuator from a time point when synchronization is established, in the case where the first mode is selected.

With such a configuration, start of drive of the actuator can be determined in consideration of an operation time period of the actuator. Therefore, a difference in rotation speed between the first gear and the second gear can be made as small as possible.

Preferably, the control device stops the motor when timing to start drive of the actuator comes after lapse of a reference time period, in the case where the first mode is selected.

With such a configuration, in the case where synchronization will not be established at the time of completion of the operation of the actuator in spite of the first mode having been selected, the motor is stopped and the engine can be started with the second gear being stopped.

Preferably, the control device starts drive of the motor based on completion of engagement between the first gear and the second gear, in the case where the second mode is selected.

With such a configuration, in the case of the second mode, the engine can be started while the first gear and the second gear are engaged with each other.

Preferably, the control device stops drive of the motor and the actuator when start of the engine is completed.

With such a configuration, after start of the engine is completed, drive of the motor and the actuator is stopped and power consumption by the starter can be prevented.

Preferably, the actuator includes a solenoid. The actuator moves the second gear from a stand-by position to an engagement position with the first gear when the solenoid is excited, and returns the second gear to the stand-by position when the solenoid is no longer excited.

With such a configuration, the first gear and the second gear can be engaged with each other by exciting the solenoid and disengagement can be achieved by not exciting the solenoid.

A vehicle according to the present invention includes an engine for generating driving force for running the vehicle, a starter for starting the engine, and a control device for controlling the starter. The starter includes a second gear that can be engaged with a first gear coupled to a crankshaft of the engine, an actuator for moving the second gear to an engagement position with the first gear in a driven state, and a motor for rotating the second gear. The control device is capable of individually controlling each of the actuator and the motor. The control device carries out control by using a first mode in which the motor is driven prior to drive of the actuator and a second mode in which the actuator engages the first gear and the second gear with each other prior to drive of the motor. The control device switches selection between the first mode and the second mode based on a reduction rate in rotation speed of the engine, when a request for starting the engine based on an operator's operation is made.

According to such a vehicle, the starter capable of individually controlling each of the actuator and the motor is controlled by using the first mode in which the motor is driven prior to drive of the actuator and the second mode in which the actuator engages the first gear and the second gear with each other prior to drive of the motor. Then, when a request for starting the engine is made, selection between the first mode and the second mode is switched based on a reduction rate in engine rotation speed. When the engine rotation speed sharply lowers (that is, when a reduction rate is great), there may be a case where the engine rotation speed has already lowered by the time of completion of the operation for engagement by the actuator, in spite of an attempt to start the engine with the use of the first mode. Therefore, selection between the first mode and the second mode can appropriately be made by taking into account a reduction rate in engine rotation speed.

Advantageous Effects of Invention

According to the present invention, an engine can be restarted in a short period of time without waiting for lowering in engine rotation speed while worsening of a state of engagement between a pinion gear and a ring gear is suppressed, in an engine starting device having a starter capable of independently controlling an operation for engaging the pinion gear and an operation for rotating the pinion gear.

DESCRIPTION OF EMBODIMENTS

An embodiment of the present invention will be described hereinafter with reference to the drawings. In the description below, the same elements have the same reference characters allotted. Their label and function are also identical. Therefore, detailed description thereof will not be repeated.

[Structure of Engine Starting Device]

Figure 1:
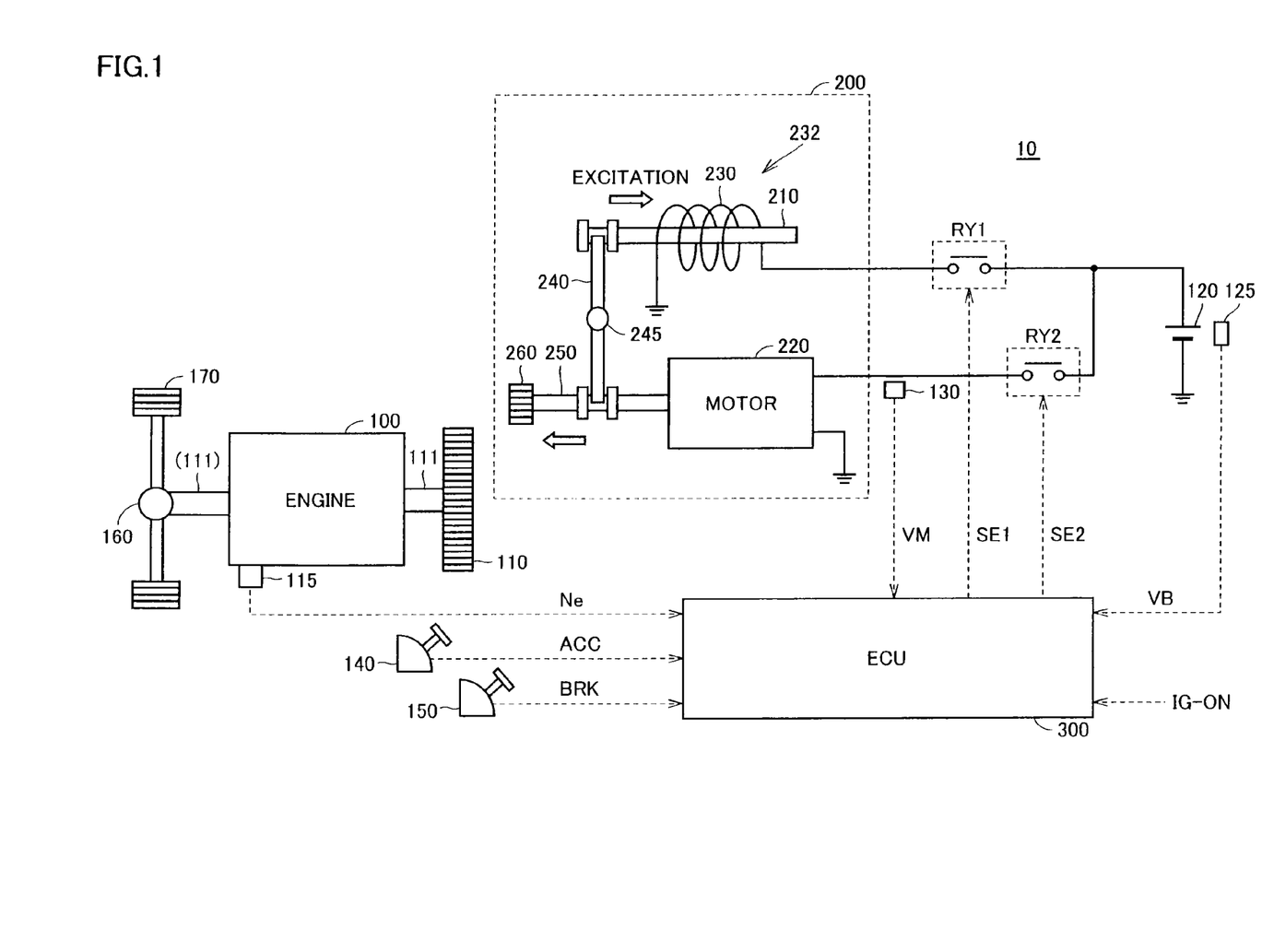
FIG. 1 is an overall block diagram of a vehicle incorporating an engine starting device according to the present embodiment.

FIG. 1 is an overall block diagram of a vehicle 10 incorporating an engine starting device according to the present embodiment.

Referring to FIG. 1, vehicle 10 includes an engine 100, a battery 120, a starter 200, a control device (hereinafter also referred to as an ECU (Electronic Control Unit)) 300, and relays RY1, RY2. Starter 200 includes a plunger 210, a motor 220, a solenoid 230, a coupling portion 240, an output member 250, and a pinion gear 260.

Engine 100 generates driving force for running vehicle 10. A crankshaft 111 of engine 100 is connected to a drive wheel 170, with a powertrain 160 structured to include a clutch, a reduction gear, or the like being interposed.

Engine 100 is provided with a rotation speed sensor 115. Rotation speed sensor 115 detects a rotation speed Ne of engine 100 and outputs a detection result to ECU 300.

Battery 120 is an electric power storage component configured such that it can be charged and can discharge. Battery 120 is configured to include a secondary battery such as a lithium ion battery, a nickel metal hydride battery, a lead-acid battery, or the like. Alternatively, battery 120 may be implemented by a power storage element such as an electric double layer capacitor.

Battery 120 is connected to starter 200 with relays RY1, RY2 controlled by ECU 300 being interposed. Battery 120 supplies a supply voltage for driving to starter 200 as relays RY1, RY2 are closed. It is noted that a negative electrode of battery 120 is connected to a body earth of vehicle 10.

Battery 120 is provided with a voltage sensor 125. Voltage sensor 125 detects an output voltage VB of battery 120 and outputs a detection value to ECU 300.

Relay RY1 has one end connected to a positive electrode of battery 120 and the other end connected to one end of solenoid 230 within starter 200. Relay RY1 is controlled by a control signal SE1 from ECU 300 so as to switch between supply and cut-off of a supply voltage from battery 120 to solenoid 230.

Relay RY2 has one end connected to the positive electrode of battery 120 and the other end connected to motor 220 within starter 200. Relay RY2 is controlled by a control signal SE2 from ECU 300 so as to switch between supply and cut-off of a supply voltage from battery 120 to motor 220. In addition, a voltage sensor 130 is provided in a power line connecting relay RY2 and motor 220 to each other. Voltage sensor 130 detects a motor voltage VM and outputs a detection value to ECU 300.

As described above, supply of a supply voltage to motor 220 and solenoid 230 within starter 200 can individually be controlled by relays RY1, RY2.

Output member 250 is coupled to a rotation shaft of a rotor (not shown) within the motor, for example, by a straight spline or the like. In addition, pinion gear 260 is provided on an end portion of output member 250 opposite to motor 220. As relay RY2 is closed, the supply voltage is supplied from battery 120 so as to rotate motor 220. Then, output member 250 transmits the rotational operation of the rotor to pinion gear 260, to thereby rotate pinion gear 260.

As described above, solenoid 230 has one end connected to relay RY1 and the other end connected to the body earth. As relay RY1 is closed and solenoid 230 is excited, solenoid 230 attracts plunger 210 in a direction of arrow. Namely, solenoid 230 and plunger 210 constitute an actuator 232.

Plunger 210 is coupled to output member 250 with coupling portion 240 being interposed. As solenoid 230 is excited, plunger 210 is attracted in the direction of the arrow. Thus, coupling portion 240 of which fulcrum 245 is fixed moves output member 250 from a stand-by position shown in FIG. 1 in a direction reverse to a direction of operation of plunger 210, that is, a direction in which pinion gear 260 moves away from a main body of motor 220, to an engagement position with a ring gear 110. In addition, biasing force reverse to the arrow in FIG. 1 is applied to plunger 210 by a not-shown spring mechanism, and when solenoid 230 is no longer excited, it returns to the stand-by position.

As output member 250 thus operates in an axial direction as a result of excitation of plunger 210, pinion gear 260 is engaged with ring gear 110 attached to crankshaft 111 of engine 100. Then, as pinion gear 260 performs a rotational operation while pinion gear 260 and ring gear 110 are engaged with each other, engine 100 is cranked and started. Ring gear 110 is provided, for example, around an outer circumference of a flywheel of the engine.

Though not shown in FIG. 1, a one-way clutch may be provided between output member 250 and a rotor shaft of motor 220 such that the rotor of motor 220 does not rotate due to the rotational operation of ring gear 110.

In addition, actuator 232 in FIG. 1 is not limited to the mechanism as above so long as it is a mechanism capable of transmitting rotation of pinion gear 260 to ring gear 110 and switching between an engagement state and a non-engagement state of pinion gear 260 and ring gear 110. For example, such a mechanism that pinion gear 260 and ring gear 110 are engaged with each other as a result of movement of the shaft of output member 250 in a radial direction of pinion gear 260 is also applicable.

ECU 300 includes a CPU (Central Processing Unit), a storage device, and an input/output buffer, none of which is shown, and receives input from each sensor or provides output of a control command to each piece of equipment. It is noted that control of these components is not limited to processing by software, and a part thereof may also be constructed by dedicated hardware (electronic circuitry) and processed.

ECU 300 receives a signal ACC indicating an amount of operation of an accelerator pedal 140 from a sensor (not shown) provided on accelerator pedal 140. ECU 300 receives a signal BRK indicating an operation of a brake pedal 150 from a sensor (not shown) provided on brake pedal 150. In addition, ECU 300 receives a start operation signal IG-ON issued in response to a driver's ignition operation or the like. Based on such information, ECU 300 generates a start request signal of engine 100 and a stop request signal thereof and outputs control signal SE1, SE2 in accordance therewith, so as to control an operation of starter 200.

[Description of Operation Mode of Starter]

Figure 2:
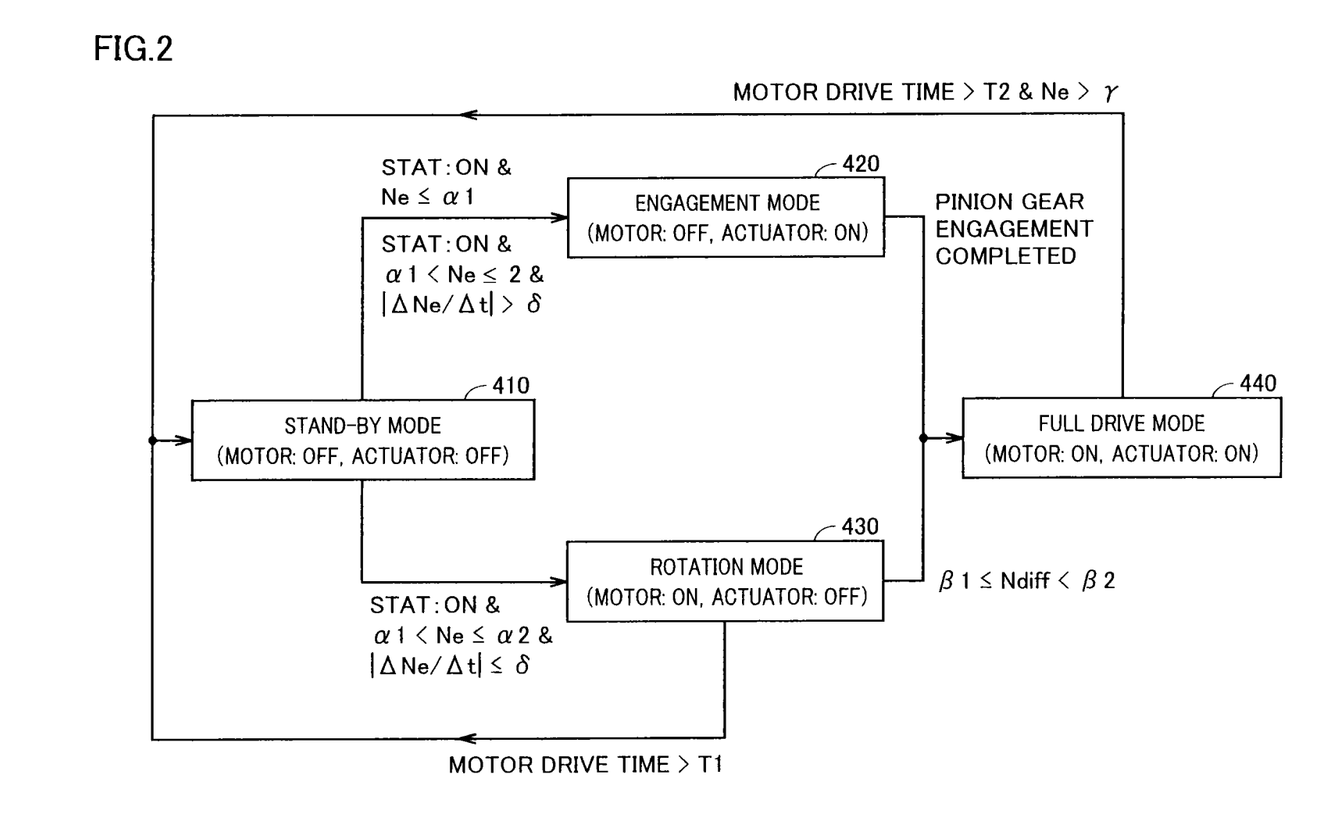
FIG. 2 is a diagram for illustrating transition of an operation mode of a starter in the present embodiment.

FIG. 2 is a diagram for illustrating transition of an operation mode of starter 200 in the present embodiment. Referring to FIGS. 1 and 2, the operation mode of starter 200 in the present embodiment includes a stand-by mode 410, an engagement mode 420, a rotation mode 430, and a full drive mode 440.

Stand-by mode 410 is a mode in which neither of actuator 232 and motor 220 in starter 200 is driven, that is, a mode in which an engine start request to starter 200 is not output. Stand-by mode 410 corresponds to an initial state of starter 200, and it is selected when drive of starter 200 is not necessary, for example, before an operation to start engine 100, after completion of start of engine 100, failure in starting engine 100, and the like.

Full drive mode 440 is a mode in which both of actuator 232 and motor 220 in starter 200 are driven. In this full drive mode 440, motor 220 performs an operation for rotating pinion gear 260 while pinion gear 260 and ring gear 110 are engaged with each other. Thus, engine 100 is actually cranked and the operation for start is started.

As described above, starter 200 in the present embodiment can individually drive each of actuator 232 and motor 220. Therefore, in a process of transition from stand-by mode 410 to full drive mode 440, there are a case where actuator 232 is driven prior to drive of motor 220 (that is, corresponding to engagement mode 420) and a case where motor 220 is driven prior to drive of actuator 232 (that is, corresponding to rotation mode 430).

Selection between engagement mode 420 and rotation mode 430 is basically made based on rotation speed Ne of engine 100 when a re-start request of engine 100 is made.

Engagement mode 420 is a mode where only actuator 232 is driven and motor 220 is not driven. This mode is selected when pinion gear 260 and ring gear 110 can be engaged with each other even while pinion gear 260 remains stopped. Specifically, while engine 100 remains stopped or while rotation speed Ne of engine 100 is sufficiently low (Ne≤a first reference value α1), this engagement mode 420 is selected.

Then, in response to completion of engagement between pinion gear 260 and ring gear 110, the operation mode makes transition from engagement mode 420 to full-drive mode 440.

It is noted that determination as to whether or not engagement between pinion gear 260 and ring gear 110 has been completed can be made also based on a detection signal from a sensor (not shown) provided to detect a position of output member 250. Engagement in a certain period, however, is likely because of rotation of engine 100 or rotation of pinion gear 260. Therefore, determination that engagement between pinion gear 260 and ring gear 110 has been completed can be made also based on lapse of a predetermined time period since start of drive of actuator 232, without using a sensor. By doing so, arrangement of a sensor for detecting a position of output member 250 can be omitted, to thereby avoid a complicated system and to achieve reduction in cost.

Meanwhile, rotation mode 430 is a mode where only motor 220 is driven and actuator 232 is not driven. This mode is selected, for example, when a re-start request of engine 100 is output immediately after stop of engine 100 is requested and when rotation speed Ne of engine 100 is relatively high (α1<Ne≤a second reference value α2).

Thus, when rotation speed Ne of engine 100 is high, difference in speed between pinion gear 260 and ring gear 110 is great while pinion gear 260 remains stopped, and engagement between pinion gear 260 and ring gear 110 may become difficult. Therefore, in rotation mode 430, only motor 220 is driven prior to drive of actuator 232, so that a rotation speed of ring gear 110 and a rotation speed of pinion gear 260 are in synchronization with each other. Then, in response to difference between the rotation speed of ring gear 110 and the rotation speed of pinion gear 260 being sufficiently small, actuator 232 is driven and ring gear 110 and pinion gear 260 are engaged with each other. Then, the operation mode makes transition from rotation mode 430 to full drive mode 440.

It is noted that, when synchronization between a rotation speed of ring gear 110 and a rotation speed of pinion gear 260 was unsuccessful, the operation mode returns to stand-by mode 410 after a motor drive time period exceeds a prescribed time period (T1). Thereafter, in accordance with rotation speed Ne of engine 100 at that time, engagement mode 420 or rotation mode 430 is selected and a starting operation is again performed.

In the case of full drive mode 440, the operation mode makes transition from full drive mode 440 to stand-by mode 410 in response to completion of start of engine 100 and start of a self-sustained operation of engine 100.

Figure 3:
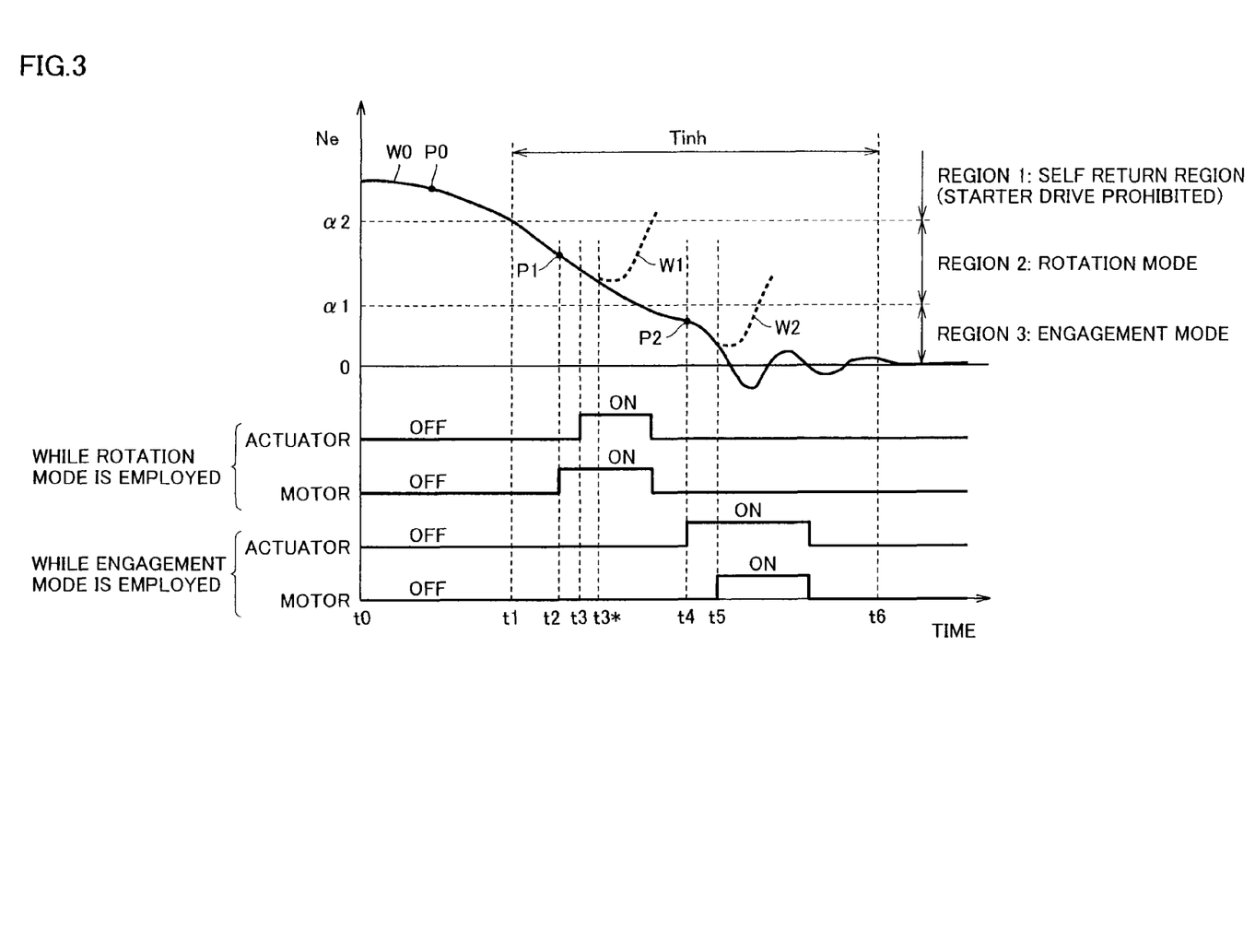
FIG. 3 is a diagram for illustrating a drive mode in an engine start operation in the present embodiment.

FIG. 3 is a diagram for illustrating two drive modes (the engagement mode, the rotation mode) in an engine start operation in the present embodiment.

In FIG. 3, the abscissa represents time and the ordinate represents rotation speed Ne of engine 100 and a state of drive of actuator 232 and motor 220 when the rotation mode is employed and the engagement mode is employed.

Referring to FIGS. 1 and 3, a case where, at a time t0, for example, a condition that the vehicle stops and the driver operates brake pedal 150 is satisfied and consequently a stop request of engine 100 is generated and combustion in engine 100 is stopped is considered. Here, unless engine 100 is re-started, rotation speed Ne of engine 100 gradually lowers as shown with a solid line W0 and finally rotation of engine 100 stops.

Then, a case where, for example, an amount of the driver's operation of brake pedal 150 attains to zero while rotation speed Ne of engine 100 is lowering, and thus a re-start request of engine 100 is generated is considered. Here, categorization into three regions based on rotation speed Ne of engine 100 is made.

A first region (region 1) refers to a case where rotation speed Ne of engine 100 is higher than second reference value α2, and for example, such a state that a re-start request is generated at a point P0 in FIG. 3.

This region 1 is a region where engine 100 can be started by a fuel injection and ignition operation without using starter 200 because rotation speed Ne of engine 100 is sufficiently high, that is, a region where engine 100 can return by itself. Therefore, in region 1, drive of starter 200 is prohibited. It is noted that second reference value α2 described above may be restricted depending on a maximum rotation speed of motor 220.

A second region (region 2) refers to a case where rotation speed Ne of engine 100 is intermediate between first reference value α1 and second reference value α2, and such a state that a re-start request is generated at a point P1 in FIG. 3.

This region 2 is a region where rotation speed Ne of engine 100 is relatively high, though engine 100 cannot return by itself. In this region, the rotation mode is selected as described with reference to FIG. 2.

When a re-start request of engine 100 is generated at a time t2, motor 220 is initially driven. Thus, pinion gear 260 starts to rotate. Then, at a time t3 when it is determined that synchronization at the time when engagement is expected to complete, between rotation speed Ne of engine 100 and a rotation speed of pinion gear 260 converted to a crankshaft 111 speed, is established, actuator 232 is driven. Then, when ring gear 110 and pinion gear 260 are engaged with each other (a time t3*), engine 100 is cranked and rotation speed Ne of engine 100 increases as shown with a dashed line W1. Thereafter, when engine 100 resumes the self-sustained operation, drive of actuator 232 and motor 220 is stopped.

A third region (region 3) refers to a case where rotation speed Ne of engine 100 is lower than first reference value α1, and for example, such a state that a re-start request is generated at a point P2 in FIG. 3.

This region 3 is a region where rotation speed Ne of engine 100 is low and pinion gear 260 and ring gear 110 can be engaged with each other without synchronizing pinion gear 260. In this region, the engagement mode is selected as described with reference to FIG. 2.

When a re-start request of engine 100 is generated at a time t4, actuator 232 is initially driven. Thus, pinion gear 260 is pushed toward ring gear 110. Thereafter, in response to completion of engagement between pinion gear 260 and ring gear 110 or lapse of a prescribed time period, motor 220 is driven (a time t5 in FIG. 3). Thus, engine 100 is cranked and rotation speed Ne of engine 100 increases as shown with a dashed line W2. Thereafter, when engine 100 resumes the self-sustained operation, drive of actuator 232 and motor 220 is stopped.

By thus controlling re-start of engine 100 by using starter 200 capable of individually driving actuator 232 and motor 220, engine 100 can be re-started in a shorter period of time than in a case of the conventional starter where an operation to re-start engine 100 was prohibited during a period (Tinh) from a rotation speed at which return of engine 100 by itself was impossible (time t1 in FIG. 3) to stop of engine 100 (a time t6 in FIG. 3). Thus, driver's uncomfortable feeling due to delayed re-start of the engine can be lessened.

As described above, however, in the case where selection between the engagement mode and the rotation mode is made only based on rotation speed Ne of engine 100 at the time point of generation of a re-start request of engine 100, for example, when a re-start request of engine 100 is generated while the rotation speed of engine 100 sharply decreases, there may be a case that synchronization between ring gear 110 and pinion gear 260 cannot be established well.

Therefore, in determining selection between the engagement mode and the rotation mode in the present embodiment, not only rotation speed Ne of engine 100 but also a change rate over time of rotation speed Ne of engine 100 are taken into account, which will be described hereinafter in detail with reference to FIG. 4.

[Problems at the Time of Sudden Throttle Down of Engine]

Figure 4:
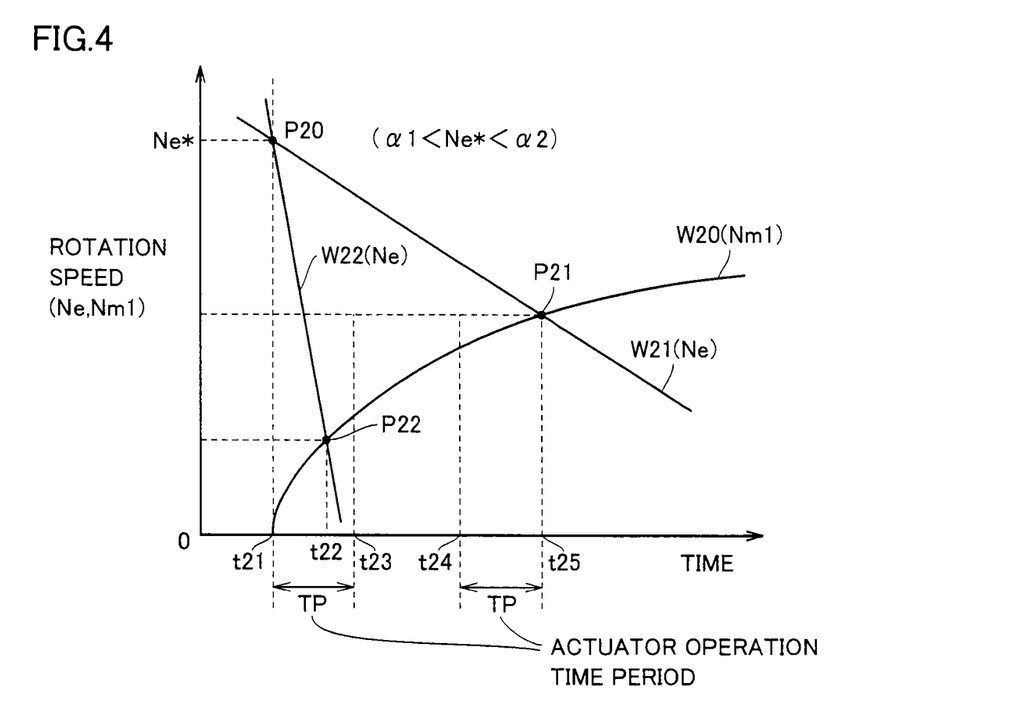
FIG. 4 is a diagram for illustrating problems in a rotation mode at the time when the engine suddenly throttles down.

FIG. 4 is a diagram for illustrating the problems in the rotation mode at the time when the engine suddenly throttles down. In FIG. 4, the abscissa represents time and the ordinate represents rotation speed Ne of engine 100 and a motor rotation speed Nm1 converted to a crankshaft speed.

Referring to FIGS. 1 and 4, a case where a re-start request of the engine is made with rotation speed Ne of engine 100 being set to a rotation speed Ne* ($\alpha1<Ne^*\leq\alpha2$) at a time t21 shown with a point 20 is now considered.

In this case, when the operation mode is determined only based on the rotation speed of engine 100, this case corresponds to region 2 in FIG. 3 in consideration of $\alpha1<Ne^*\leq\alpha2$, and hence the rotation mode is selected.

Then, in the case where a reduction rate in rotation speed of engine 100 is relatively gentle (a line W21 in FIG. 4), at a time t25 after motor 220 is driven, motor rotation speed Nm1 converted to a crankshaft speed and engine rotation speed Ne are in synchronization with each other (a point P21 in FIG. 4). Therefore, drive of actuator 232 is started at a time t24 in consideration of an operation time period TP of plunger 210. By doing so, pinion gear 260 and ring gear 110 are engaged with each other at time t25 while they are in synchronization with each other.

In the case where a reduction rate in rotation speed of engine 100 is sharp (a line W22 in FIG. 4), however, when drive of motor 220 is started in response to a re-start request of the engine at time t21, engine 100 and motor 220 are in synchronization with each other at a time t22 (a point P22 in FIG. 4). Here, for example, even though drive of actuator 232 is started simultaneously with start of drive of motor 220 at time t21, a period from time t21 to time t22 is shorter than operation time period TP of plunger 210. Therefore, at the time point when the operation of plunger 210 is completed, deviation between rotation speed Ne of engine 100 and motor rotation speed Nm1 converted to a crankshaft speed has already become great. Consequently, in the rotation mode, a state of engagement between pinion gear 260 and ring gear 110 may be bad.

Therefore, in operation mode setting control in the present embodiment, the operation mode is determined in consideration not only of the engine rotation speed at the time when a start request of the engine is made but also a reduction rate in engine rotation speed. Specifically, when magnitude (an absolute value) of a reduction rate in engine rotation speed is great, the rotation mode is not selected but the engagement mode is selected instead, even though the engine rotation speed at the time when start is requested is intermediate between first reference value α1 and second reference value α2.

By doing so, starting of the engine in a short period of time from issuance of a re-start request of the engine can be expected to start, while the state of engagement between pinion gear 260 and ring gear 110 is prevented from worsening in the case where a reduction rate in engine rotation speed is high.

[Description of Operation Mode Setting Control]

Figure 5:
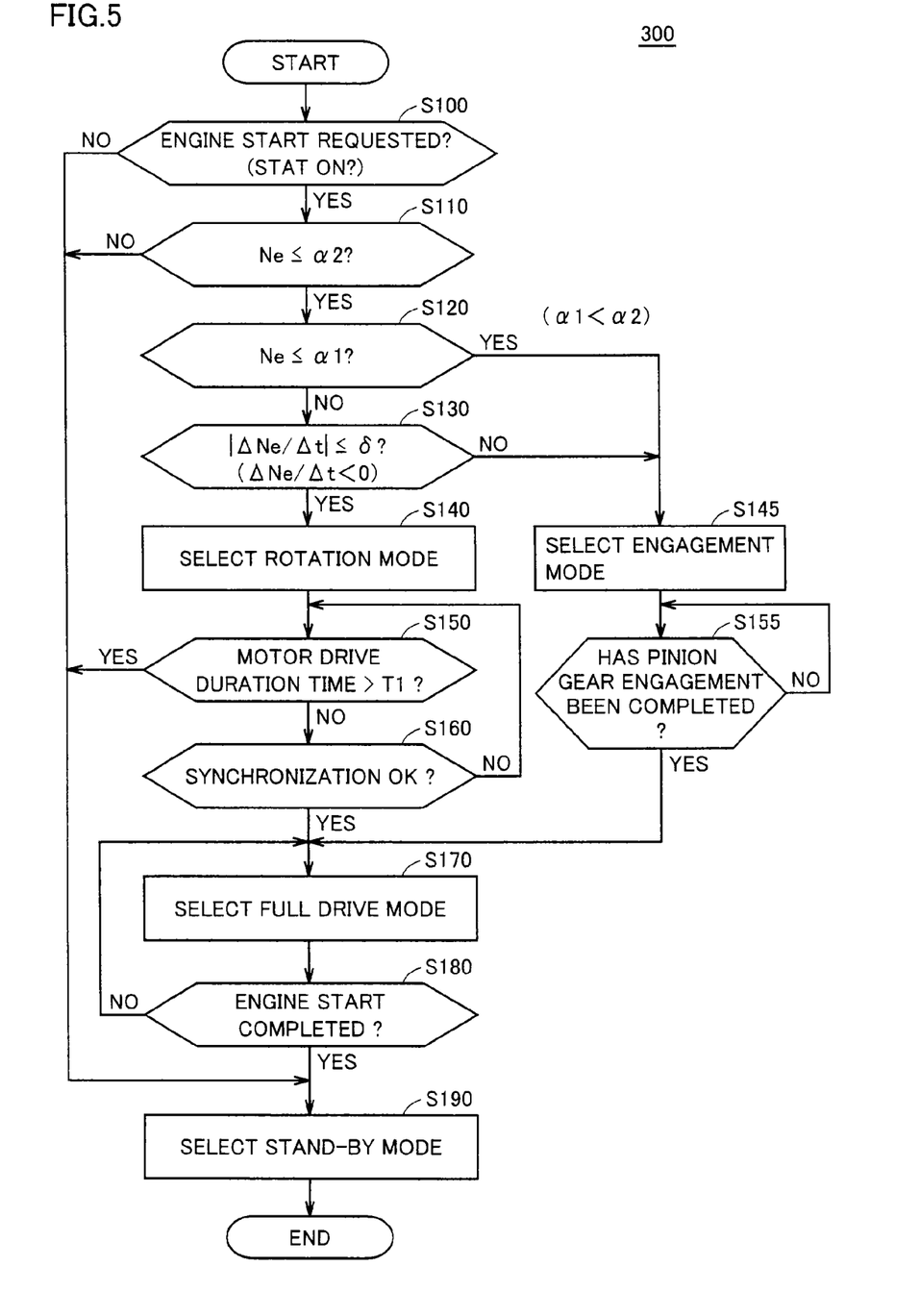
FIG. 5 is a flowchart for illustrating details of operation mode setting control processing performed by an ECU in the present embodiment.

FIG. 5 is a flowchart for illustrating details of operation mode setting control processing performed by ECU 300 in the present embodiment. The flowcharts shown in FIG. 5 and FIG. 6 which will be described later are realized by executing a program stored in advance in ECU 300 in a prescribed cycle.

Alternatively, regarding some steps, processing can also be performed by constructing dedicated hardware (electronic circuitry).

Referring to FIGS. 1 and 5, in step (hereinafter the step being abbreviated as S) 100, ECU 300 determines whether or not start of engine 100 has been requested. Namely, whether or not to start engine 100 is determined.

When start of engine 100 has not been requested (NO in S100), the process proceeds to S190 and ECU 300 selects the stand-by mode because an operation to start engine 100 is not necessary.

When start of engine 100 has been requested (YES in S100), the process proceeds to S110 and ECU 300 then determines whether or not rotation speed Ne of engine 100 is equal to or smaller than second reference value $\alpha 2$.

When rotation speed Ne of engine 100 is greater than second reference value $\alpha 2$ (NO in S110), this case corresponds to region 1 in FIG. 3 where engine 100 can return to self-sustained operation by itself. Therefore, ECU 300 causes the process to proceed to S190 and selects the stand-by mode.

When rotation speed Ne of engine 100 is equal to or smaller than second reference value $\alpha 2$ (YES in S110), ECU 300 further determines whether or not rotation speed Ne of engine 100 is equal to or smaller than first reference value $\alpha 1$.

When rotation speed Ne of engine 100 is equal to or smaller than first reference value $\alpha 1$ (YES in S120), this case corresponds to region 1 in FIG. 3. Therefore, the process proceeds to S145 and ECU 300 selects the engagement mode. Then, ECU 300 outputs control signal SE1 so as to close relay RY1, and thus actuator 232 is driven. Here, motor 220 is not driven.

Then, ECU 300 determines in S155 whether or not engagement between pinion gear 260 and ring gear 110 has been completed. This determination may be made based on position detection using a sensor as described above or based on lapse of a prescribed time period.

When engagement between pinion gear 260 and ring gear 110 has not been completed (NO in S155), the process returns to S155 and ECU 300 waits until engagement between pinion gear 260 and ring gear 110 is completed.

On the other hand, when engagement between pinion gear 260 and ring gear 110 is completed (YES in S155), the process proceeds to S170 and ECU 300 selects the full-drive mode. Then, starter 200 starts cranking of engine 100.

Then, in S180, ECU 300 determines whether or not start of engine 100 has been completed. Determination of completion of start of engine 100 may be made, for example, based on whether or not the engine rotation speed is greater than a threshold value y indicating the self-sustained operation after lapse of a prescribed time period since start of drive of motor 220.

When start of engine 100 has not been completed (NO in S180), the process returns to S170 and cranking of engine 100 is continued.

When start of engine 100 has been completed (YES in S180), the process proceeds to S190 and ECU 300 selects the stand-by mode.

On the other hand, when rotation speed Ne of engine 100 is greater than first reference value $\alpha 1$ (NO in S120), the process proceeds to S130, and ECU 300 then determines whether or not magnitude (an absolute value) of a reduction rate in engine rotation speed $\Delta Ne/\Delta t$ ($\Delta Ne/\Delta t<0$) is equal to or smaller than a threshold value $\delta$. This is done in order not to select the rotation mode unless rotation speed Ne of engine 100 can be in synchronization with motor rotation speed Nm1 converted to a crankshaft speed even when a re-start request of engine 100 is made in region 2 in FIG. 4 in the case where engine 100 suddenly throttles down as described with reference to FIG. 4.

When magnitude of reduction rate in engine rotation speed $\Delta Ne/\Delta t$ is greater than threshold value $\delta$ (NO in S130), the process proceeds to S145, where engine 100 is started in the engagement mode as described above.

When magnitude of reduction rate in engine rotation speed $\Delta Ne/\Delta t$ is equal to or lower than threshold value $\delta$ (YES in S130), the process proceeds to S140 and ECU 300 selects the rotation mode. Then, ECU 300 outputs control signal SE2 so as to close relay RY2, and thus motor 220 is driven. Here, actuator 232 is not driven.

Then, ECU 300 determines in S150 whether or not a duration during which motor 220 is driven has exceeded prescribed time period T1.

When the duration during which motor 220 is driven has exceeded prescribed time period T1 (YES in S150), ECU 300 determines that synchronization between pinion gear 260 and ring gear 110 has not been established and engine 100 could not be started, causes the process to proceed to S190, and once selects the stand-by mode. Thereafter, the processing from S100 is again performed and the engine start processing is performed.

When the duration during which motor 220 is driven has not exceeded prescribed time period T1 (NO in S150), the process proceeds to S160 and ECU 300 determines whether or not synchronization at the time when an operation of actuator 232 is expected to complete, between a rotation speed Ne1 of engine 100 and rotation speed Nm1 of motor 220 converted to a crankshaft speed, is established. Determination of establishment of synchronization is specifically made based on whether or not a relative rotation speed Ndiff between rotation speed Ne1 of engine 100 and rotation speed Nm1 of motor 220 converted to a crankshaft speed (Ne1−Nm1) is in between prescribed threshold values ($0 \leq \beta 1 \leq Ndiff < \beta 2$). Though determination of establishment of synchronization may be made based on whether or not an absolute value of relative rotation speed Ndiff is smaller than a threshold value $\beta$ ($|Ndiff|<\beta$), engagement is more preferably carried out while rotation speed Ne1 of engine 100 is higher than rotation speed Nm1 of motor 220.

When it is determined that synchronization has not been established (NO in S160), the process returns to S150 and ECU 300 waits for establishment of synchronization.

When it is determined that synchronization has been established (YES in step S160), ECU 300 causes the process to proceed to S170 and selects the full-drive mode. Actuator 232 is thus driven, so that pinion gear 260 and ring gear 110 are engaged with each other and engine 100 is cranked.

Though not shown in FIG. 5, when the self-sustained operation of the engine is not started in spite of lapse of a prescribed time period while the engine is being cranked in S170, for example, due to shortage of fuel or failure of an igniter, the operation mode may return to the stand-by mode, determining that there is possibility of failure.

As a result of control in accordance with the processing as above, an operation mode at the time of re-start of the engine can be determined in consideration of a reduction rate in engine rotation speed in addition to the engine rotation speed. Thus, in the case where the engine rotation speed is sharply lowering, the engagement mode rather than the rotation mode is preferentially selected in spite of a relatively high engine rotation speed. Consequently, in the case where the engine rotation speed and the motor rotation speed cannot be in synchronization with each other due to sudden throttle down of the engine at the time of completion of the operation for engagement by the actuator, inappropriate selection of the rotation mode can be prevented, and the engine can be restarted in a short period of time while worsening of the state of engagement between the pinion gear and the ring gear is suppressed.

[Variation]

In the flowchart described above, a case where which of the rotation mode and the engagement mode is to be selected is determined based on whether or not magnitude of reduction rate in engine rotation speed ΔNe/Δt is equal to or lower than prescribed threshold value δ in S130 has been described. Alternatively, however, determination may be made based on a difference between predicted rotation speed Nm1 of motor 220 converted to a crankshaft speed and the predicted rotation speed Ne1 of engine 100 after lapse of the operation time period of actuator 232.

Figure 6:
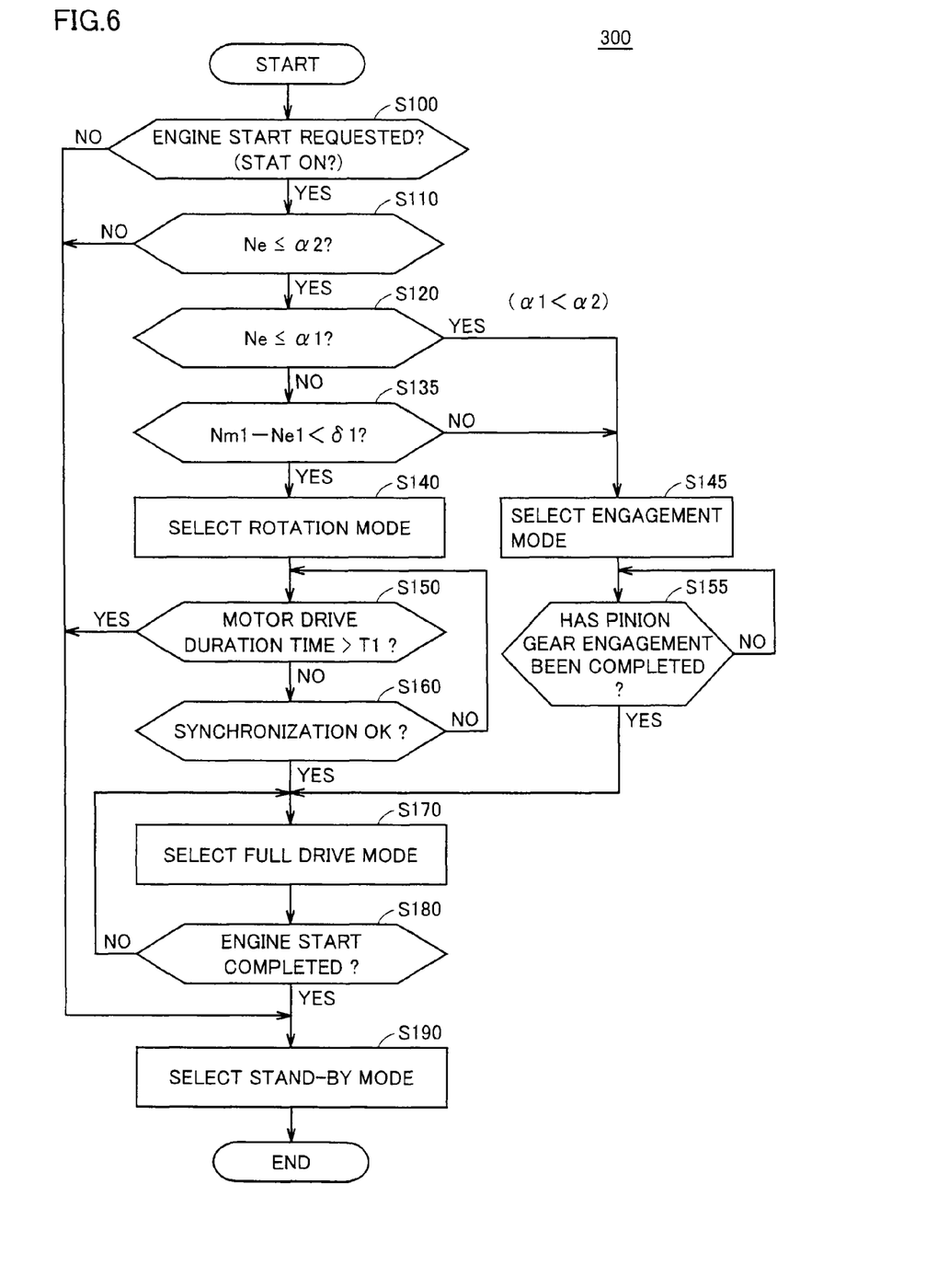
FIG. 6 is a flowchart for illustrating details of operation mode setting control processing performed by the ECU in a variation of the present embodiment.

FIG. 6 is a flowchart for illustrating a variation of the operation mode setting control processing described with reference to FIG. 5. In FIG. 6, step S130 in FIG. 5 has been replaced with S135. Description of the step in FIG. 6 the same as in FIG. 5 will not be repeated.

In S120, when rotation speed Ne of engine 100 is greater than first reference value α1 (NO in S120), the process proceeds to S135. In S135, ECU 300 determines whether or not a difference (Nm1−Ne1) between predicted motor rotation speed Nm1 converted to a crankshaft speed and engine rotation speed Ne1 after lapse of a basic operation time period of plunger 210 since the current time is equal to or smaller than a threshold value δ1 (δ1>0). In other words, at the time of completion of the operation for engagement by actuator 232, whether or not rotation speed Ne1 of engine 100 has already become sufficiently lower than motor rotation speed Nm1 and a state may be such that synchronization cannot be established is determined.

It is noted that engine rotation speed Ne1 after lapse of the operation time period (TP) of actuator 232 here is calculated as Ne1=Ne+TP·(ΔNe/Δt).

Then, when a difference (Nm1−Ne1) between motor rotation speed Nm1 and engine rotation speed Ne1 is equal to or smaller than threshold value δ1 (YES in S135), the process proceeds to S140, where ECU 300 selects the rotation mode.

On the other hand, when a difference (Nm1−Ne1) between motor rotation speed Nm1 and engine rotation speed Ne1 is greater than threshold value 81 (NO in S135), the process proceeds to S145, where ECU 300 selects the engagement mode.

Thus, by switching selection between the rotation mode and the engagement mode based on the predicted rotation speed of the motor converted to a crankshaft speed and the predicted rotation speed of the engine after lapse of the operation time period of the actuator, inappropriate selection of the rotation mode can be prevented in the case where the engine rotation speed and the motor rotation speed cannot be in synchronization with each other at the time of completion of the operation for engagement by the actuator due to sudden lowering in the engine rotation speed.

It is noted that the same value as threshold value δ described in S130 in FIG. 5 may be adopted as threshold value δ1 here.

It is noted that "ring gear 110" and "pinion gear 260" in the present embodiment represent the "first gear" and the "second gear" in the present invention by way of example, respectively. In addition, the "rotation mode" and the "engagement mode" in the present embodiment represent the "first mode" and the "second mode" in the present invention by way of example, respectively.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A device for starting an engine, comprising:
a starter for starting said engine; and
a control device for controlling said starter,
said starter including
a second gear that can be engaged with a first gear coupled to a crankshaft of said engine,
an actuator for moving said second gear to an engagement position with said first gear in a driven state, and
a motor for rotating said second gear,
said control device being capable of individually controlling each of said actuator and said motor,
said control device carrying out control by using a first mode in which said motor is driven prior to drive of said actuator and a second mode in which said actuator engages said second gear and said first gear with each other prior to drive of said motor, and
said control device switching selection between said first mode and said second mode based on a reduction rate in rotation speed of said engine, when a request for starting said engine based on an operation by an operator,
wherein said control device switches selection between said first mode and said second mode based on a rotation speed of said engine and the reduction rate in rotation speed of said engine, when the request for starting said engine based on the operation by the operator, and
wherein said control device selects said first mode when a magnitude of said reduction rate is smaller than a threshold value while the rotation speed of said engine is intermediate between a first reference value and a second reference value greater than said first reference value.

2. The device for starting an engine according to claim 1, wherein
said control device selects said second mode regardless of said reduction rate when the rotation speed of said engine is lower than said first reference value.

3. The device for starting an engine according to claim 1, wherein
said control device selects said second mode when magnitude of said reduction rate is greater than said threshold value while the rotation speed of said engine is intermediate between said first reference value and said second reference value.

4. The device for starting an engine according to claim 1, wherein
said control device selects said second mode when the rotation speed of said engine at a time when an operation for engagement by said actuator is expected to complete is lower than a rotation speed of said motor converted to a speed of said crankshaft of said engine at the time when the operation for engagement by said actuator is expected to complete.

5. The device for starting an engine according to claim 1, wherein
said control device determines that synchronization is established when a difference between the rotation speed of said engine at a time when an operation for engagement by said actuator is expected to complete and a rotation speed of said motor converted to a speed of said crankshaft of said engine at the time when the operation for engagement by said actuator is expected to complete is in a range between predetermined threshold values, and in a case where said first mode is selected, said control device drives said actuator to engage said first gear and said second gear with each other when it is determined that said synchronization is established.

6. The device for starting an engine according to claim 5, wherein
said control device starts drive of said actuator at a time point calculated by subtracting an operation time period of said actuator from a time point when said synchronization is established, in the case where said first mode is selected.

7. The device for starting an engine according to claim 6, wherein
said control device stops said motor when timing to start drive of said actuator comes after lapse of a reference time period, in the case where said first mode is selected.

8. The device for starting an engine according to claim 1, wherein
said control device starts drive of said motor based on completion of engagement between said first gear and said second gear, in a case where said second mode is selected.

9. The device for starting an engine according to claim 1, wherein
said control device stops drive of said motor and said actuator when start of said engine is completed.

10. The device for starting an engine according to claim 1, wherein
said actuator includes a solenoid, and
said actuator moves said second gear from a stand-by position to an engagement position with said first gear when said solenoid is excited, and returns said second gear to said stand-by position when said solenoid is no longer excited.

11. A device for starting an engine, comprising:
a starter for starting said engine; and
a control device for controlling said starter,
said starter including
a second gear that can be engaged with a first gear coupled to a crankshaft of said engine,
an actuator for moving said second gear to an engagement position with said first gear in a driven state, and
a motor for rotating said second gear,
said control device being capable of individually controlling each of said actuator and said motor,
said control device carrying out control by using a first mode in which said motor is driven prior to drive of said actuator and a second mode in which said actuator engages said second gear and said first gear with each other prior to drive of said motor, and
said control device switching selection between said first mode and said second mode based on a reduction rate in rotation speed of said engine,
wherein when a magnitude of a reduction rate in rotation speed of said engine is a first value which is larger than a second value, said control device selects said first mode when a request for starting said engine based on an operation by an operator is provided.

12. The device for starting an engine according to claim 11, wherein said control device selects said first mode or said second mode based on a rotation speed of said engine and a magnitude of a reduction rate in rotation speed of said engine, and
while said rotation speed of said engine is intermediate between a first reference value and a second reference value greater than said first reference value, said control device selects said second mode when a magnitude of a reduction rate in rotation speed of said engine is said first value and said control device selects said first mode when the magnitude of the reduction rate in rotation speed of said engine is said second value.

* * * * *